A. B. CAMPBELL.
PULLEY BLOCK.
APPLICATION FILED MAR. 14, 1916.
1,220,182.  Patented Mar. 27, 1917.
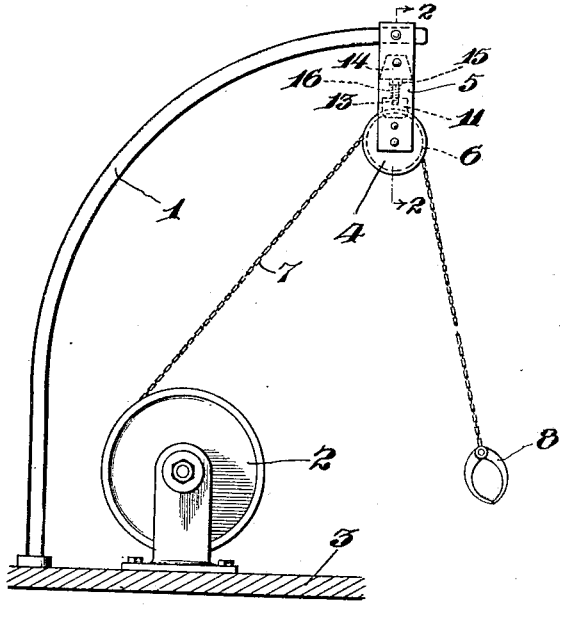
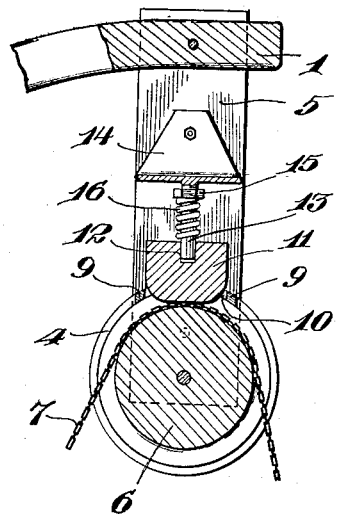
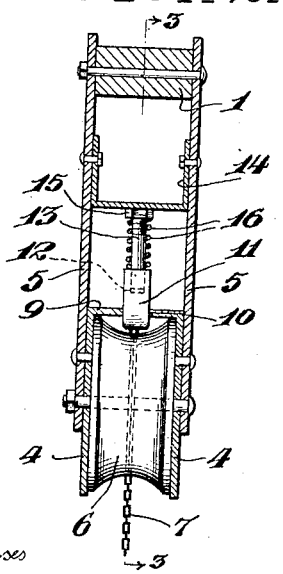
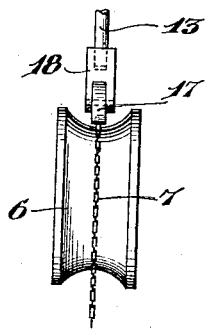
Witnesses
Wm. Conway
C. R. Ziegler
Inventor
Addington B. Campbell,
By Joshua R. H. Potts.
his Attorney

UNITED STATES PATENT OFFICE.

ADDINGTON B. CAMPBELL, OF NEWPORT, NEW JERSEY.

PULLEY-BLOCK.

1,220,182.  Specification of Letters Patent.  Patented Mar. 27, 1917.

Application filed March 14, 1916. Serial No. 84,040.

*To all whom it may concern:*

Be it known that I, ADDINGTON B. CAMPBELL, a citizen of the United States, residing at Newport, in the county of Cumberland and State of New Jersey, have invented certain new and useful Improvements in Pulley-Blocks, of which the following is a specification.

My invention relates to improvements in pulley blocks, and more particularly to an attachment for pulley blocks which operates to prevent slack in the chain or other flexible device between the pulley and the hoisting drum, the object of the invention being to so bind the chain to the surface of the pulley that the chain can run over the pulley only as regulated by the hoisting drum, and slack between the drum and pulley absolutely prevented.

With ordinary apparatus such as commonly used, on oyster dredging boats, accidents are liable to happen and frequently do happen because there is a slack in the chain between the pulley and the drum, and when the osyter tongs are moved, the chain runs out suddenly and cannot be controlled because of such slack.

With my improvements, undue slack in the chain is absolutely prevented.

With these and other objects in view, the invention consists in certain novel features of construction and combinations and arrangements of parts as will be more fully hereinafter described and pointed out in the claims.

In the accompanying drawings:

Figure 1 is a view in elevation illustrating my improvements.

Fig. 2 is an enlarged view in section on the line 2—2 of Fig. 1.

Fig. 3 is a view in section on the line 3—3 of Fig. 2, and

Fig. 4 is a view in elevation showing a modified form of brake shoe.

1 represents a swinging boom, and 2 a hoisting drum both located upon a support 3, which may constitute the deck of a boat.

4 represents a pulley block supported by parallel bars 5 secured to the boom 2, and suspending the pulley block from the free end of the boom.

6 is a pulley mounted to turn in the pulley block, and over which a chain 7 is passed. The chain 7 at one end is secured to and wound upon the drum 2, and at its other end carries a pair of tongs 8 for dredging or for other work.

Pulley block 4 is provided with a bridge 9, having a slot 10 therein through which brake shoe 11 projects, and bears against the chain 7, holding the chain against the pulley, and preventing any slipping of the chain on the pulley or any accidental turning of the pulley to cause a slack in the chain between the pulley and the drum. This shoe 11 is made with a recess 12, receiving the lower end of a pin 13, and movable on the pin.

The pin 13 is integral with a bifurcated bracket 14, which latter is secured at its opposite sides to the bars 5, and an adjusting nut 15 is screwed onto the threaded upper portion of pin 13. A coiled spring 16 is located around the pin 13, between brake shoe 11 and nut 15, and exerts a constant pressure on the shoe to insure its proper engagement with the chain.

The nut 15 permits adjustment of the spring tension, so as to permit the chain and pulley to turn, but at the same time prevent accidental movement. The movement of the links of the chain under the brake shoe causes the latter to move up and down, operating very much as a ratchet device.

In the modification shown in Fig. 4, I illustrate a roller 17 carried by the shoe 18, corresponding to the brake shoe 11. This roller 17 engages the chain 7, and operates as does the shoe 11, except that it reduces friction to a minimum.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination of a support, a pulley block on the support, a pulley rotatably mounted in said block, a flexible member supported on the pulley, a bridge extending over the edge of the pulley and having a slot therein forming a guideway, a shoe having a portion extending through the slot and in frictional engagement with said flexible member, and a spring operative to move and keep the shoe in frictional engagement with the flexible member to press the latter into engagement with the pulley, substantially as described.

2. The combination with a support, a pulley block secured to the support, a pulley in the pulley block, and a flexible device supported on the pulley, of a bracket secured to the support and having a pin thereon, a brake shoe movable on the pin and engaging the flexible device on the pulley, a spring around the pin exerting pressure on the brake shoe, a nut adjustable on the pin and engaging the spring, and a slotted bridge on the block through which the brake shoe projects, substantially as described.

In testimony whereof I have signed my name to this specification in the presence of two subscribing witnesses.

ADDINGTON B. CAMPBELL.

Witnesses:
EDWARD BEDFORD,
DAVID C. LARE.

Copies of this patent may be obtained for five cents each, by addressing the "Commissioner of Patents, Washington, D. C."